(12) United States Patent
Pachao-Morbitzer et al.

(10) Patent No.: US 6,997,330 B2
(45) Date of Patent: Feb. 14, 2006

(54) APPARATUS AND METHOD FOR STORING OR SHIPPING ELONGATED MEMBERS

(75) Inventors: Nelson Mario Pachao-Morbitzer, Zarate (AR); Guillermo Oscar Dapino, San Luis (AR); Hugo A. Ernst, Buenos Aires (AR)

(73) Assignee: Siderca S.A.I.C, Buenos Aires (AR)

( * ) Notice: Subject to any disclaimer, the term of this patent is extended or adjusted under 35 U.S.C. 154(b) by 0 days.

(21) Appl. No.: 10/368,601

(22) Filed: Feb. 20, 2003

(65) Prior Publication Data

US 2004/0164209 A1    Aug. 26, 2004

(51) Int. Cl.
*A47F 1/04*    (2006.01)

(52) U.S. Cl. .............. 211/59.4; 206/391; 248/68.1

(58) Field of Classification Search ............ 248/65, 248/67.5, 67.7, 68.1, 70, 72, 73, 74.4, 346.02; 211/59.4, 60.1; 410/36, 42; 206/391
See application file for complete search history.

(56) References Cited

U.S. PATENT DOCUMENTS

| | | | | |
|---|---|---|---|---|
| 3,590,752 A | * | 7/1971 | De Pew | 108/55.3 |
| 3,968,323 A | * | 7/1976 | Blanchet | 174/135 |
| 4,769,876 A | * | 9/1988 | Platt | 24/459 |
| 4,919,372 A | * | 4/1990 | Twist et al. | 248/56 |
| 5,123,547 A | | 6/1992 | Koch | 211/59.4 |
| 5,161,703 A | * | 11/1992 | Patton | 211/59.4 |
| 5,433,322 A | | 7/1995 | Williams | 206/443 |
| D381,180 S | | 7/1997 | Schueneman et al. | D34/38 |
| 5,649,632 A | | 7/1997 | Terashima et al. | 211/59.4 |
| D385,080 S | | 10/1997 | Schueneman et al. | D34/38 |
| 5,778,801 A | * | 7/1998 | Delacour | 108/57.25 |
| D400,441 S | | 11/1998 | Warren | D9/456 |
| 5,876,084 A | * | 3/1999 | Smith et al. | 296/39.1 |

(Continued)

FOREIGN PATENT DOCUMENTS

AR    69811    12/2001

(Continued)

*Primary Examiner*—Ramon O Ramirez
(74) *Attorney, Agent, or Firm*—Fitzpatrick, Cella, Harper & Scinto

(57) ABSTRACT

An assembly for storing elongated members, the assembly comprising an elongated support element and a pair of segments. The segments are disposed on opposite sides of the elongated support element from each other, and each of the segments defines a cradle for supporting an elongated member. The pair of segments is joined together at a seam formed by locally heating and melting contacting edges of the segments to fuse them together. Moreover, the pair of segments is fixed to the elongated support element against movement in a longitudinal direction of the elongated support element. The elongated support element has a textured region of raised protrusions, indentations, or holes, over at least a portion of the surface thereof. Each cradle comprises a center portion located longitudinally between a pair of inclined portions. When an elongated member is supported in the cradle, the center portion of the cradle is convex about an axis parallel to the longitudinal axis of the elongated support element, such that water will drain laterally off of the cradle.

16 Claims, 6 Drawing Sheets

U.S. PATENT DOCUMENTS

| | | | |
|---|---|---|---|
| 5,899,331 A | 5/1999 | Warren, Jr. | 206/443 |
| 5,934,467 A | 8/1999 | Gilfert et al. | 206/391 |
| 6,209,839 B1 | 4/2001 | O'Malley | 248/346.02 |
| 6,261,037 B1 | 7/2001 | Richards et al. | 410/36 |
| 6,302,671 B1 | 10/2001 | Gilfert et al. | 425/84 |
| 6,322,034 B1 | 11/2001 | O'Malley | 248/346.02 |
| 6,474,613 B1 | 11/2002 | O'Malley | 248/346.02 |
| 6,524,426 B1 * | 2/2003 | St. John et al. | 156/309.6 |
| 2002/0063194 A1 | 5/2002 | O'Malley | 248/346.02 |

FOREIGN PATENT DOCUMENTS

| | | |
|---|---|---|
| GB | 2101953 | 1/1983 |
| JP | 64-30720 A * | 1/1989 |

* cited by examiner

US 6,997,330 B2

APPARATUS AND METHOD FOR STORING OR SHIPPING ELONGATED MEMBERS

BACKGROUND OF THE INVENTION

1. Field of the Invention

The instant invention relates to an apparatus and method for supporting elongated members during storage and shipping ("a pipe packer assembly").

2. Description of the Related Art

Various different supports for storing elongated members are known in the art. For example, Argentine Industrial Model No. 69811 (Serral et al.) discloses a "Tube Support" for tube storage and transportation. FIG. 1 illustrates a conventional tube support of the type disclosed in the Serral et al. patent. This tube support comprises a hollow bar 1 having a series of modules 2 positioned thereon by sliding them over the end of the bar 1. The modules 2 are made of plastic and have a rectangular orifice corresponding to the size and shape of the bar 1. The top and bottom surfaces of each module 2 include a partial cylindrical section 4 that is concave in the outward direction, and a flat section 5 at the end of each module 2. The modules 2 are held in place by butt ends 10, which are formed by bending flat side portions of the bar 1 outward to prevent the modules 2 from sliding off the bar 1. The partial cylindrical sections 4 of adjacent modules form semicircular depressions or cradles sized to accommodate and support tube members positioned transversely to the bar 1. In operation a plurality of tube supports are positioned to support one or more lengths of tubing.

Another example of a known support for elongated members is U.S. Pat. No. 5,649,632 (Terashima et al.), which discloses a fixture for accommodating various sizes of pipe. As shown in FIGS. 1A–E of the Terashima et al. patent, the fixture 10 comprises a plurality of fixture bodies 15A and 15B and spacer members 25 clamped together by a bar member 18 extending along the outer edges of the fixture bodies 15A and 15B to define a plurality of pipe support surfaces 12. The spacer members 25 are disposed between flat inclined portions 11A and 11B of the fixture bodies 15A and 15B to form cradles. Various different sized spacers 25 can be inserted between at inclined portions 11A and 11B of the fixture bodies 15A and 15B, as illustrated in FIGS. 5A–C, in order to form cradles of different size for accommodating different sized pipes. Raised protrusions 30 are formed on the inclined portions to prevent shift or movement of the pipe material. Flat plate members 16 are positioned at each end of the assembly and are sized to fit over the ends of the bars 18 to secure the modules on the rods 18. A plurality of the fixtures 10 can be superposed and held in place by clamp frames 17 with elongated set bolts 19 extending therethrough.

However, there are various disadvantages associated with these known types of supports. For example, when elongated members are stored outside, both of these known types of supports tend to collect rainwater in the supporting cradles, which may damage the surface of the elongated members.

Another shortfall of these conventional supports is that they do not allow complete customization and adaptability of the supports. Rather, the modules or fixture bodies are held in place only by flanges or plates at the ends of the support bars, thus, requiring that there be modules or fixture bodies positioned along the entire length of the support bar. That is, neither of these arrangements allows the modules or fixture bodies to be spaced apart from one another to accommodate elongated members having large and/or differing diameters, without the need for additional spacers or the like.

Thus, the present inventors set out to develop a support assembly for elongated members during storage and shipping that remedies these and other deficiencies found in the prior art supports.

SUMMARY OF THE INVENTION

The instant invention relates to an improved apparatus and method for supporting elongated members during storage and shipping.

In one aspect, the present invention relates to an assembly for storing elongated members, the assembly comprising an elongated support element and at least one segment disposed on the elongated support element. Each segment at least partially defines a cradle for supporting an elongated member positioned transversely to the elongated support element. Each segment is joined to the support element by locally heating and melting an edge of the segment so as to fix the segment against movement in a longitudinal direction along the elongated support element.

In another aspect, the present invention relates to an assembly for storing elongated members, the assembly comprising an elongated support element and at least one cradle disposed on the elongated support element for supporting an elongated member transversely to the support element. The cradle comprises a center portion located longitudinally between a pair of inclined portions, and is convex about an axis parallel to the longitudinal axis of the elongated support element, such that water will drain laterally off of the cradle.

In yet another aspect, the present invention relates to An assembly for storing elongated members, the assembly comprising an elongated support element and at least one cradle disposed on the elongated support element for supporting an elongated member transversely to the support element. Each cradle is defined by at least one segment disposed on the elongated support element. Each segment is joined to the elongated support element by locally heating and melting an edge of the segment so as to fix the segment against movement in a longitudinal direction along the elongated support element. Moreover, each cradle comprises a center portion located longitudinally between a pair of inclined portions, and is convex about an axis parallel to the longitudinal axis of the elongated support element, such that water will drain laterally off of the cradle.

In still another aspect, the present invention relates to a method of making an assembly for storing elongated members. The method comprises the steps of providing an elongated support element and at least one segment which at least partially defines a cradle, positioning the at least one segment on the elongated support element to define a cradle for supporting an elongated member, and joining the segment to the support element by locally heating and melting a part of the segment.

DETAILED DESCRIPTION

Figure 1:
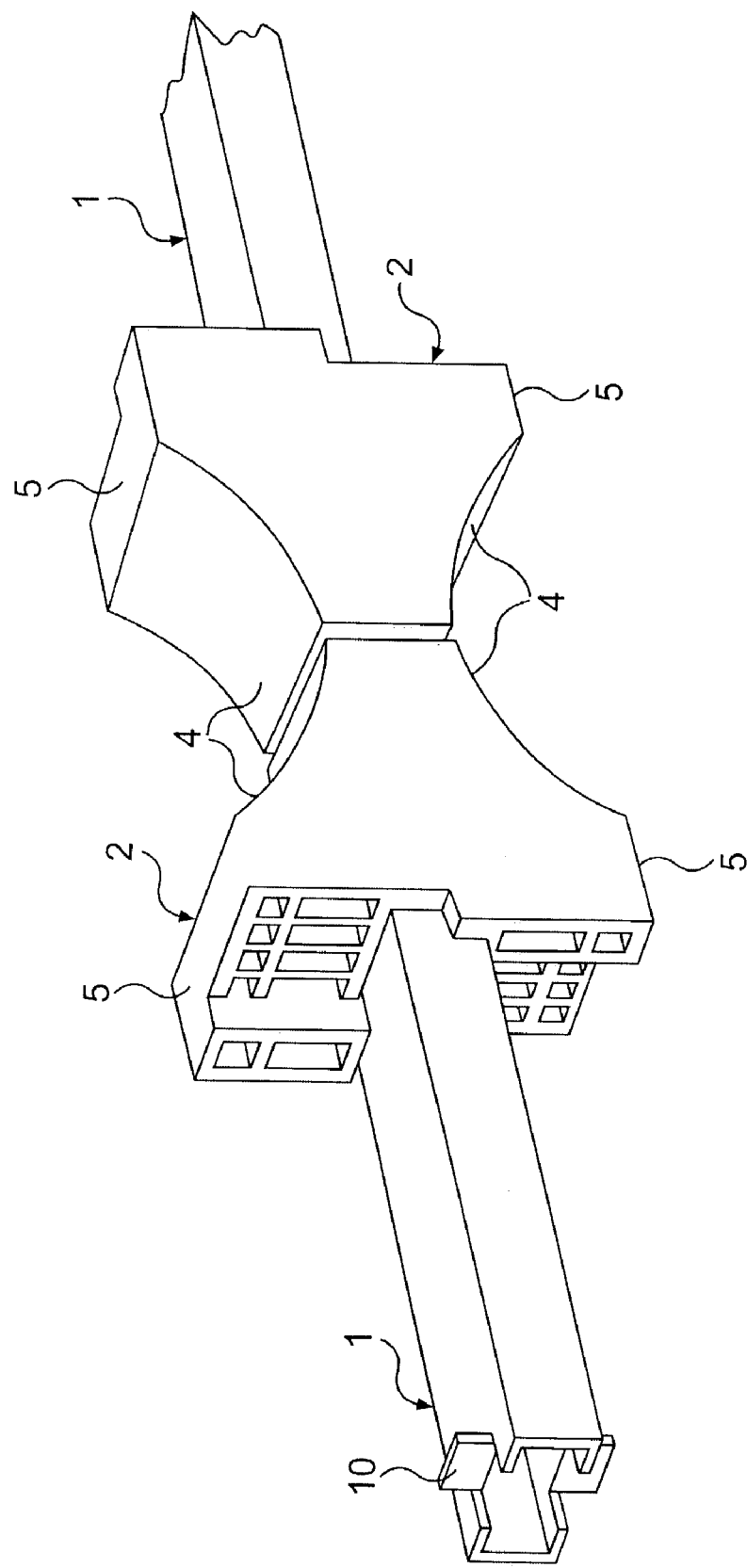
FIG. 1 is a perspective view of a portion of a prior art support assembly for elongated members, showing two modules on a hollow bar.

The pipe packer assembly of the present invention serves to store and/or ship elongated members, such as pipes, tubes, rods, roll stock, or the like. Generally, the pipe packer assembly comprises a plurality of elongated support elements 208, 308 positioned transverse to elongated members 210, 310 that are to be shipped or stored. Each of the elongated support elements 208, 308 has a number of cradles 201, 301 positioned along the length thereof for engaging and supporting the elongated members 210, 310 that are to be shipped or stored.

First Embodiment

In a first embodiment of the piper packer assembly, shown in FIGS. 2A–2D, a plurality of elongated support elements 208 is arranged transversally to the elongated members 210 that are to be stored or shipped. Each of the elongated support elements 208 has a plurality of cradles 201 positioned along a longitudinal axis thereof.

Each cradle 201 is formed by juxtaposing a pair of short segments 202 having a vertical plane of symmetry on an elongated support element 208. The segments 202 are all identical and each has a large axial end 204 and a small axial end 203. The segments 202 are positioned along the elongated support element 208 in an alternating fashion, such that the small axial end 203 of each segment 202 is positioned directly adjacent the small axial end 203 of the next adjacent segment 202. Similarly, the large axial end 204 of each segment 202 is either positioned closest the large axial end of the next adjacent segment 202 or is located near an end of the elongated support element 208.

Figure 2A:
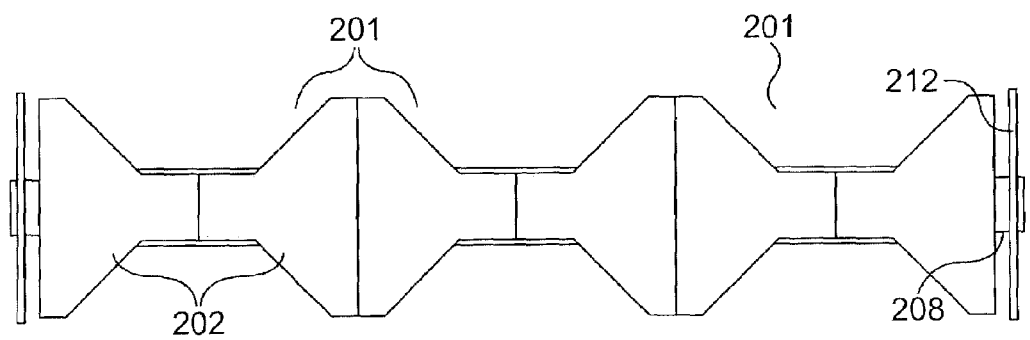
FIG. 2A is a front view of a first embodiment of the support assembly of the present invention, showing six segments held together transversely to form pairs along a longitudinal hollow bar.
Figure 2B:
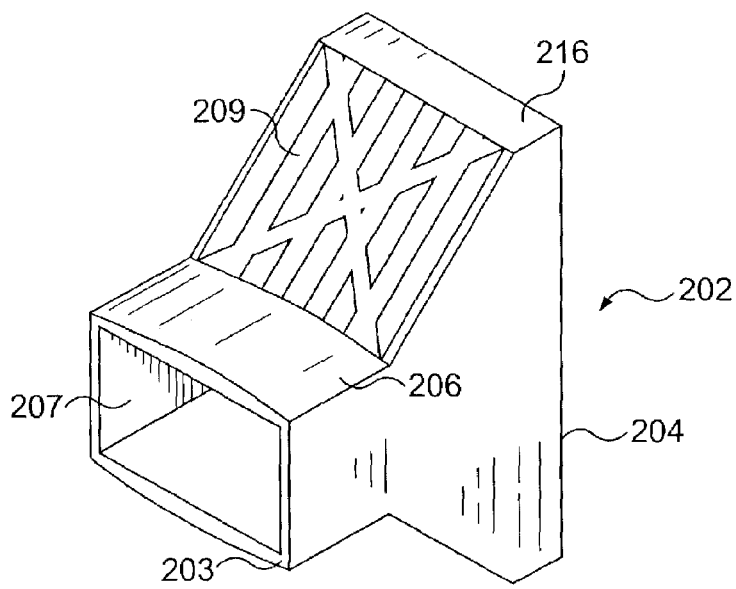
FIG. 2B is a perspective view of a segment of the support assembly of the first embodiment of the present invention.

When viewed in perspective from the top and front as in FIG. 2B, each segment 202 has a lower horizontal portion 206, an inclined portion 205, and an upper horizontal portion 216. The inclined portions 205 and lower horizontal portions 206 of two neighboring segments 202, are positioned on an elongated support element 208 with their smaller axial ends 203 facing one another, thereby forming each cradle 201 of the pipe packer assembly.

Figure 2C:
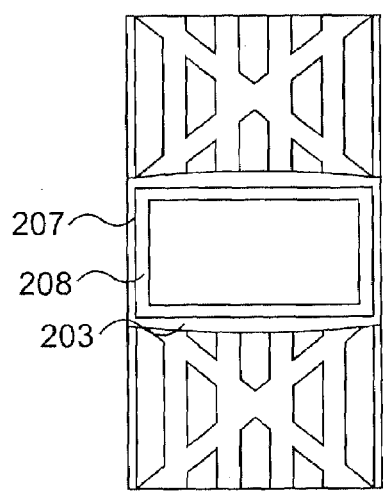
FIG. 2C is a side view of a segment of the support assembly of the first embodiment of the present invention.

As illustrated in FIGS. 2B and 2C, the lower horizontal surface 206 of each segment is slightly convex and each inclined surface 205 is provided with troughs and flutings 209, which together cooperate to prevent the collection of water in each cradle 201 of the pipe packer assembly.

A longitudinal duct 207 is formed through the center of each segment 202 so that the segments can slide over the outer surface of an elongated support element 208. The elongated support elements 208 generally have a square or rectangular cross section (although any other suitable cross section may also be used), which matches the shape of the central duct 207 and supports the segments 202. The loose segments 202 may be held together on an elongated support element 208 by plates 212, which are slid over each end of an elongated support element 208 and welded closely adjacent a large end 204 of the outermost segments 202, as best illustrated in FIG. 2A.

Alternatively, the segments 202 of the first embodiment may be fused in place on an elongated support element 208 by locally heating and melting the lateral surfaces of the segments 202 to fuse the segments in place on the elongated support element 208. At least one outer surface of each elongated support element 208 is provided with a textured region 218 extending along at least a portion of the surface of the elongated support element 208, as shown in FIG. 2E. The textured region 218 may extend over the entire length of the elongated support element 208 or only certain portions or surfaces. Further, the textured region 218 may comprise small protrusions, holes, indentations, or the like. When the segments 202 are fused to the elongated support element 208, the melted polymeric material of the segments 202 will conform to the shape of the textured region 218 to secure the cradles 201 in place on the elongated support element 208. This allows the cradles 201 to be spaced selectively apart from each other a distance S, as shown in FIG. 2E, to accommodate elongated members of different diameters. For example, the segments 202 may be fused on the elongated support element 208 with spaces S in between, as shown in FIG. 2E, so as to be able to accommodate large diameter pipes. Alternatively, the segments 202 may be fused on the elongated support element 208 directly adjacent one another, as shown in FIG. 2A, so as to be able to accommodate a greater number of small diameter pipes.

Figure 2D:
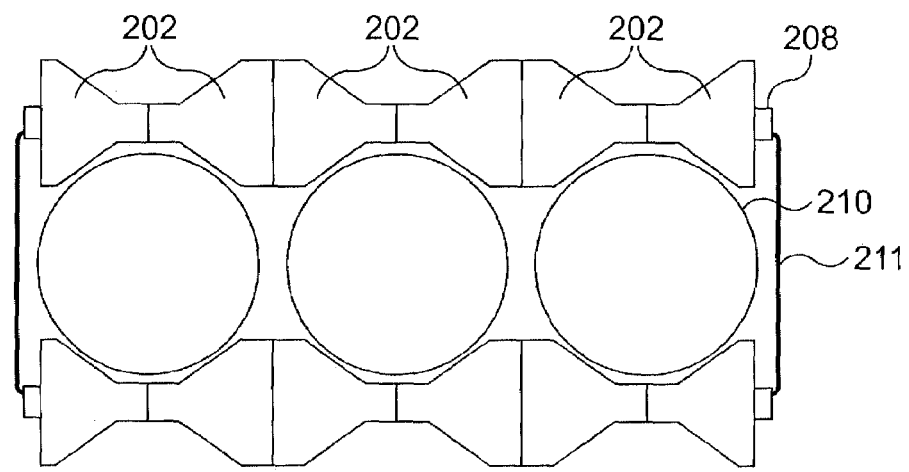
FIG. 2D is a front view of the first embodiment of the support assembly of the present invention, showing twelve segments on a pair of hollow bars, being used to support the top and bottom of several elongated members.
Figure 2E:
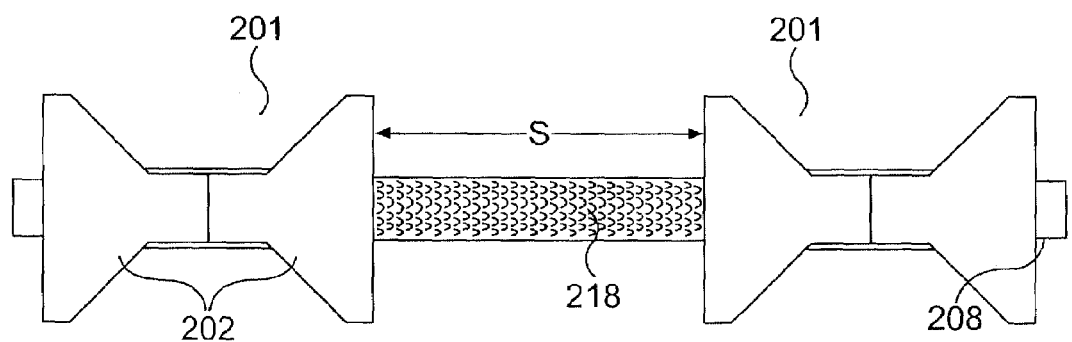
FIG. 2E is a front view of the first embodiment of the support assembly of the present invention, showing four segments fused to an elongated support element that define two cradles spaced apart from one another along the length of the elongated support element.

A plurality of elongated support elements 208 can be arranged in superposed relation and held together by steel or polymeric bands 211 passing through the elongated support elements 208, as shown in FIG. 2D, or by means of a clamping frame tightened using threaded rods (not shown).

While each cradle 201 of the first embodiment is described as preferably being formed from a pair of adjacent segments 202, it is also contemplated that each cradle could be formed from a single, integral segment having a lower central portion and a pair of inclined portions.

Second Embodiment

In a second embodiment, shown in FIGS. 3A–3E, a plurality of segments 302 is again positioned along the length of an elongated support element 308. In this embodiment, however, each of the segments 302 has a C-shaped cross-section 307 for engagement with the top or bottom of an elongated support element 308. The segments 302 are arranged in pairs, with one segment 302 positioned on either side of the elongated support element 308.

When the segments 302 are arranged on opposite sides of the elongated support element 308 from one another, the C-shaped cross-sections 307 face one another to define a central duct that accommodates the elongated support element 308. Each segment 302 is also provided with longitudinal contact edges 320 that, when the segments are positioned on the elongated support element 308, extend around each side of the elongated support element 308 and abut a corresponding longitudinal contact edge 320 of the other segment.

Figure 3A:
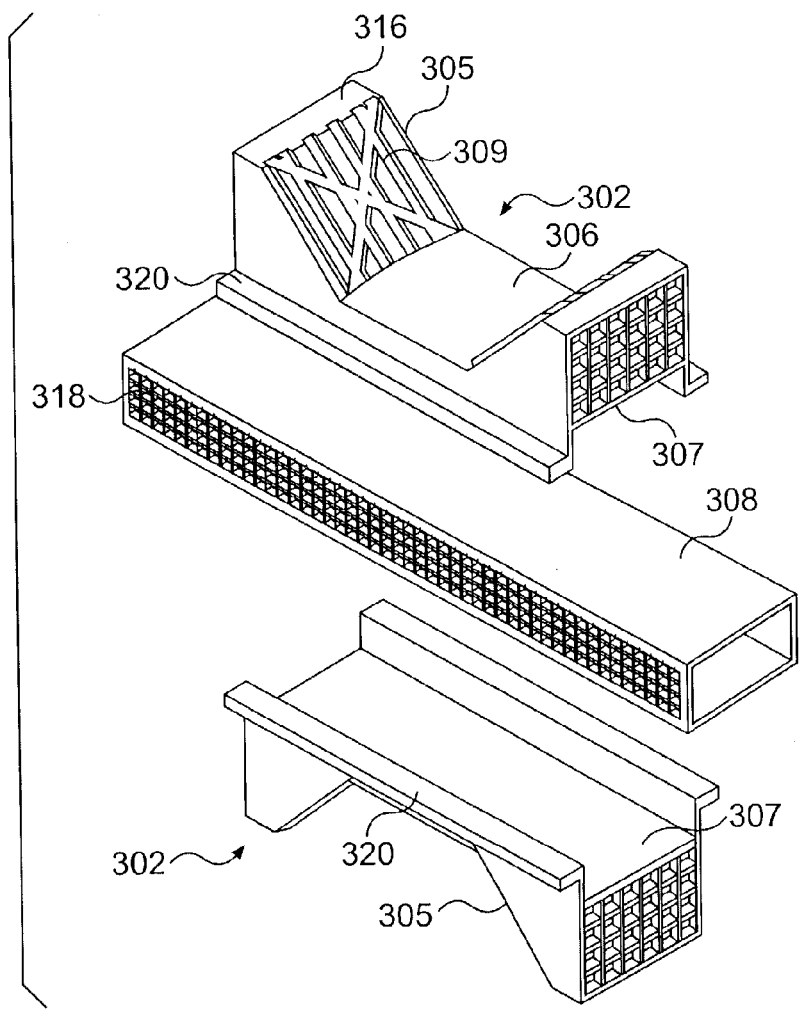
FIG. 3A is a partial exploded perspective view of a second embodiment of the support assembly of the present invention, showing two segments spaced from top and bottom sides of a hollow bar.

When viewed in perspective from the top and front, as in FIG. 3A, the segments 302 have a lower center portion 306, an inclined portion 305, and an upper horizontal portion 316. The lower center portion 306 is slightly convex and the inclined portion 305 is provided with troughs or flutings 309, which in cooperation prevent the collection of water in the cradles 301 of the pipe packer assembly, as in the first embodiment.

Figure 3B:
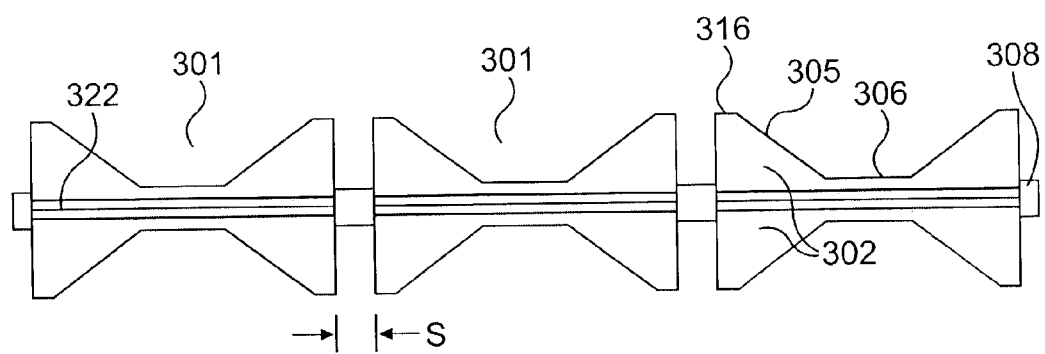
FIG. 3B is a front view of the second embodiment of the support assembly of the present invention, showing six segments spaced a part and joined together along longitudinal contact edges to form pairs on a hollow bar.
Figure 3C:
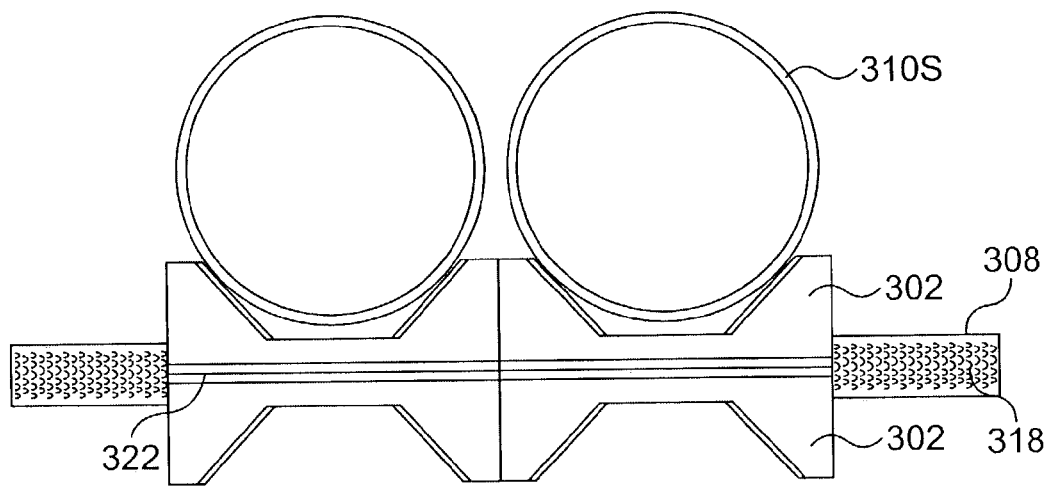
FIG. 3C is a front view of the second embodiment of the support assembly of the present invention showing segments joined together along longitudinal contact edges to form pairs which are adjacent each other along a longitudinal hollow bar, for supporting small diameter elongated members.
Figure 3D:
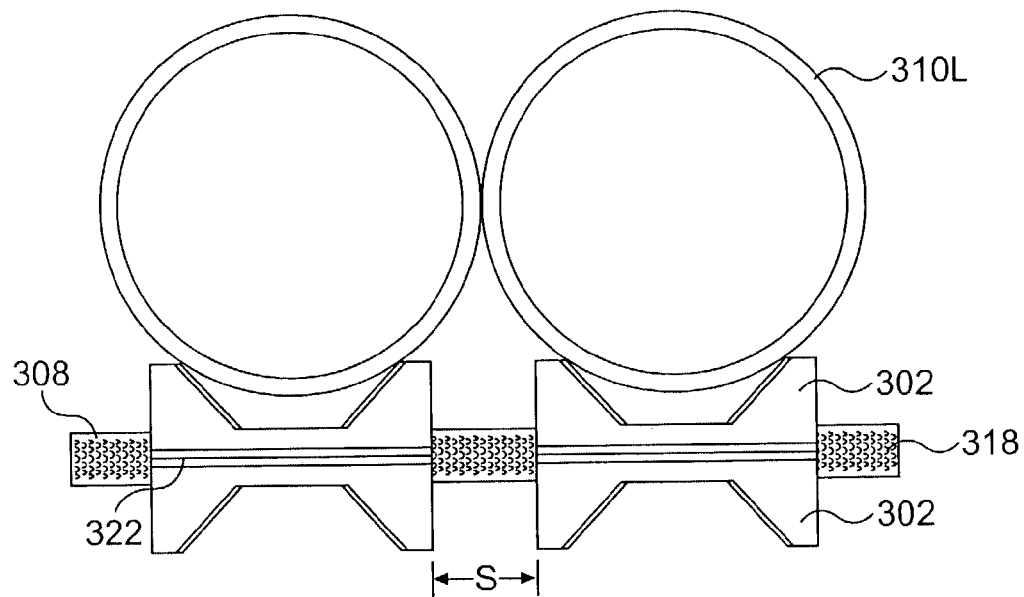
FIG. 3D is a front view of the second embodiment of the support assembly of the present invention showing segments joined together along longitudinal contact edges to form pairs which are spaced from each other along a longitudinal hollow bar, for supporting large diameter elongated members.
Figure 3E:
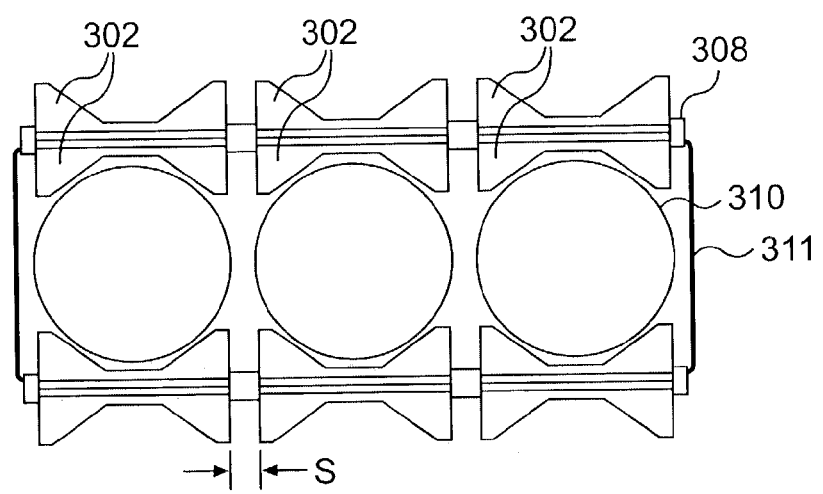
FIG. 3E is a front view of the second embodiment of the support assembly of the present invention, showing twelve segments spaced along a pair of hollow bars, being used to support both the tops and bottoms of elongated members.

The cradles 301 are formed by joining two of the segments 302 onto the elongated support element 308 by locally heating and melting the contact edges 320 of each of the segments 302 to fuse the segments 302 together at a seam 322, as shown in FIG. 3C. At least one outer surface of the elongated support element 308 is provided with a textured region 318 extending along at least a portion of the surface of the elongated support element 308. The textured region 318 may extend over the entire length of the elongated support element 308 or only certain portions or surfaces. Further, the textured region 318 may comprise small protrusions, holes, indentations, or the like. When the segments 302 are joined the melted polymeric material of the segments 302 will conform to the shape of textured region 318 to secure the cradles 301 in place on the elongated support element 308. This allows the cradles 301 to be spaced selectively apart from each other a distance S, as shown in FIGS. 3B, 3D, and 3E, to accommodate elongated members of different diameters. For example, the segments 302 may be fused on the elongated support element 308 with spaces S in between so as to be able to accommodate large diameter pipes 310L, as shown in FIG. 3D. Alternatively, the segments 302 may be fused on the elongated support element 308 directly adjacent one another so as to be able to accommodate a greater number of small diameter pipes 310S, as shown in FIG. 3C.

A plurality of elongated support elements 308 of the second embodiment can also be arranged in superposed relation and held together by steel or polymeric bands 311 passing through the elongated support elements 308, as shown in FIG. 3E, or by means of a clamping frame tightened using threaded rods (not shown).

Figure 3F:
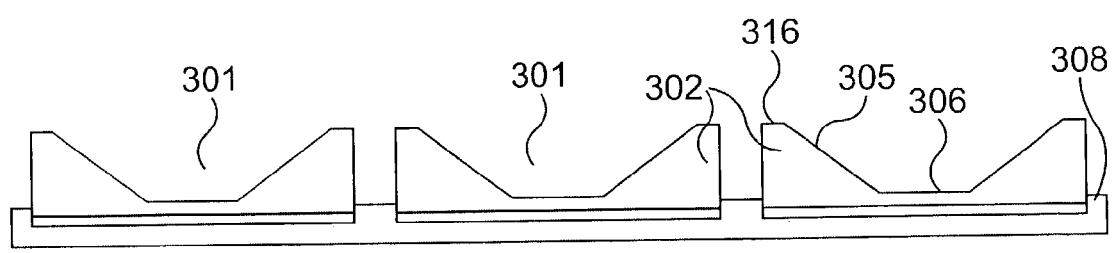
FIG. 3F is a front view of the second embodiment of the support assembly of the present invention, showing three segments fused along only one side of an elongated support member.

It may be desirable in certain instances, such as on the top and bottom layers of a pipe packer assembly, to position segments 302 on only a top or bottom side of an elongated support element 308. In this case, rather than fusing a pair of segments 302 to one another on opposite sides of an elongated support element 308, one or more segments 302 could be fused to the elongated support element 308 along and overlapping only one side. For example, segments 302 might be disposed on only the top of an elongated support element 308, as shown in FIG. 3F, when the assembly is to be used as the bottom layer of a pipe packer assembly.

The simple construction of both the first and second embodiments facilitates customization of the pipe packer assembly "at the yard." This is advantageous, since it allows the assemblies to be custom built by the pipe manufacturer on site. Thus, the elongated support elements 208, 308 can be cut to the needed size for a given shipment, and the required number segments 202, 302 can be positioned in the desired locations based on the actual size and number of elongated members 210, 310 that are to be shipped or stored.

In addition, when the segments 202, 302 are fused to the elongated support element 208, 308, there is no need for a separate retaining element at each end of the elongated support element 308, as is required in the prior art tube supports.

The elongated support element 208, 308 may also be marked on a top, bottom, or side surface with measurements to facilitate easy positioning of the cradles 201, 301 on the elongated support element 208, 308 to accommodate any desired pipe size.

Preferred embodiments of the invention have been described in detail for the purpose of disclosing a practical, operative structure whereby the invention may be practiced advantageously. These designs are intended to be illustrative, and not exhaustive. For example, while the elongated members supported by the pipe packer assembly of the present invention are all shown as having a circular cross section, the pipe packer assembly can also be adapted to support elongated members having square, rectangular, or any other geometric cross section, including elongated members having irregular cross sections. Thus, the claims should be looked to in order to assess the full scope of the invention.

We claim:

1. An assembly for storing elongated members, said assembly comprising: an elongated support element; and at least one cradle disposed in a convenient location along and upon an outer surface of the elongated support element for supporting an elongated member transversely to said support element; wherein each cradle is joined to said elongated support element by locally heating and melting an edge of said cradle against a portion of an outer surface of the elongated support element; and wherein said cradle comprises a center portion located longitudinally between a pair of inclined portions, that is convex about an axis parallel to the longitudinal axis of said elongated support element, such that water will drain laterally off of said cradle.

2. The assembly for storing elongated members according to claim 1, wherein said inclined portions have a plurality of troughs formed in their surface to facilitate drainage of water toward said center portion.

3. The assembly for storing elongated members according to claim 1, further comprising a plurality of elongated support elements arranged in superposed relation to support a plurality of elongated members, each of said elongated support elements having a plurality of cradles fixed at locations along the length thereof.

4. The assembly for storing elongated members according to claim 1, wherein each cradle is defined by a pair of segments that are positioned end to end and are fixed at a desired location on said elongated support element.

5. The assembly for storing elongated members according to claim 1, wherein each cradle comprises at least one segment that has a duct corresponding in shape to the cross-section of said elongated support element, such that said segments can be slid over and supported on said elongated support element.

6. An assembly for storing elongated members, said assembly comprising: an elongated support element; and at least one cradle disposed on said elongated support element for supporting an elongated member transversely to said support element, each cradle being defined by at least one segment disposed on said elongated support element; wherein each segment is joined to said elongated support element by locally heating and melting an edge of said segment so as to fix said segment against movement in a longitudinal direction along said elongated support element, and wherein each cradle comprises a center portion located longitudinally between a pair of inclined portions, and is convex about an axis parallel to the longitudinal axis of said elongated support element, such that water will drain laterally off of said cradle.

7. The assembly for storing elongated members according to claim 6, further comprising a plurality of elongated support elements arranged in superposed relation to support a plurality of elongated members, each of said elongated support elements having a plurality of segments disposed along the length thereof that are fixed at portions of its outer surface.

8. The assembly for storing elongated members according to claim 6, wherein at least two segments are fixed so as to be spaced apart from one another in the longitudinal direction of a respective one of said elongated support elements.

9. The assembly for storing elongated members according to claim 6, wherein said cradle comprises a polymeric material.

10. The assembly for storing elongated members according to claim 9, wherein said elongated support element has a textured region over at least a portion of the outer surface thereof.

11. The assembly for storing elongated members according to claim 10, wherein the textured region is comprised of raised protrusions projecting from the outer surface of said elongated support element.

12. The assembly for storing elongated members according to claim 10, wherein the textured region is comprised of holes formed in the outer surface of said elongated support element.

13. The assembly for storing elongated members according to claim 10, wherein the textured region is comprised of indentions formed in the outer surface of said elongated support element.

14. A method of making an assembly for storing elongated members, said method comprising the steps of: providing an elongated support element, and at least two segments comprising a polymeric material disposed so as to be positioned upon said elongated support element; positioning the at least two segments on the elongated support element to define a cradle for supporting an elongated member at a desired location, the segments spaced selectively apart to accommodate elongated members of different diameters; and joining the segments to the support element by locally heating and melting a part of the polymeric material of the segments against a portion of an outer surface of the elongated support element.

15. The method as set forth in claim 14, wherein each of said providing, positioning, and joining steps are repeated so as to provide a plurality of elongated support elements, each elongated support element having a plurality of segments positioned and joined thereon at a desired location, the plurality of segments spaced selectively apart to accommodate elongated members of different diameters.

16. The method as set forth in claim 15, wherein, in said joining step, a portion of each segment deforms and engages a textured region portion of an outer surface of the elongated support element so as to securely fix each segment against longitudinal movement at a desired location along the length of the elongated support element.

* * * * *